(12) United States Patent
Aramaki et al.

(10) Patent No.: US 6,373,845 B1
(45) Date of Patent: Apr. 16, 2002

(54) MULTILAYER ATM COMMUNICATION EQUIPMENT

(75) Inventors: Toshiya Aramaki; Yasuhiro Miyao, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/133,406

(22) Filed: Aug. 13, 1998

(30) Foreign Application Priority Data

Aug. 21, 1997 (JP) .............................................. 9-225146

(51) Int. Cl.[7] .............................................. H04L 12/28
(52) U.S. Cl. .................................... 370/395.3; 370/469
(58) Field of Search ................................ 370/395, 469, 370/474, 395.3

(56) References Cited

U.S. PATENT DOCUMENTS 6,172,991 B1 * 1/2001 Mori .......................... 370/474
6,178,171 B1 * 1/2001 Alexander, Jr. et al. .... 370/395

FOREIGN PATENT DOCUMENTS

| JP | 3-108925 | 5/1991 |
|---|---|---|
| JP | 4-138739 | 5/1992 |
| JP | 5-22294 | 1/1993 |
| JP | 5-235943 | 9/1993 |
| JP | 5-235945 | 9/1993 |
| JP | 6-326711 | 11/1994 |
| JP | 6-350606 | 12/1994 |
| JP | 7-221779 | 8/1995 |
| JP | 8-195770 | 7/1996 |
| JP | Hei 9-116560 | 5/1997 |
| JP | Hei 10-164119 | 6/1998 |

* cited by examiner

Primary Examiner—Melvin Marcelo
(74) Attorney, Agent, or Firm—Whitham, Curtis & Christofferson

(57) ABSTRACT

A multilayer ATM communication equipment includes a port VPI-VCI table, an ATM switch, an MAC frame forming section, a flow VPI-VCI table, a flow identification section, a port MAC address table, and an MAC switch section. The port VPI-VCI table stores transfer route information and input/output port information. The ATM switch transfers the ATM cell from the output port corresponding to the output port information on the basis of the transfer route information and the input port number. The MAC frame forming section forms an MAC frame on the basis of the transfer route information. The flow VPI-VCI table stores flow information and transfer output information. The flow identification section transfers the MAC frame on the basis of the transfer output information. The port MAC address table stores the destination information of the MAC frame and transfer output information. When transfer output information is stored in the port MAC address table, the MAC switch section transfers the MAC frame on the basis of the transfer output information. Otherwise, the MAC switch section assigns a new input port, notifies a transmission-side switch of the flow information and the input port, sets a shortcut path, and transfers the MAC frame from the notified output port.

10 Claims, 11 Drawing Sheets

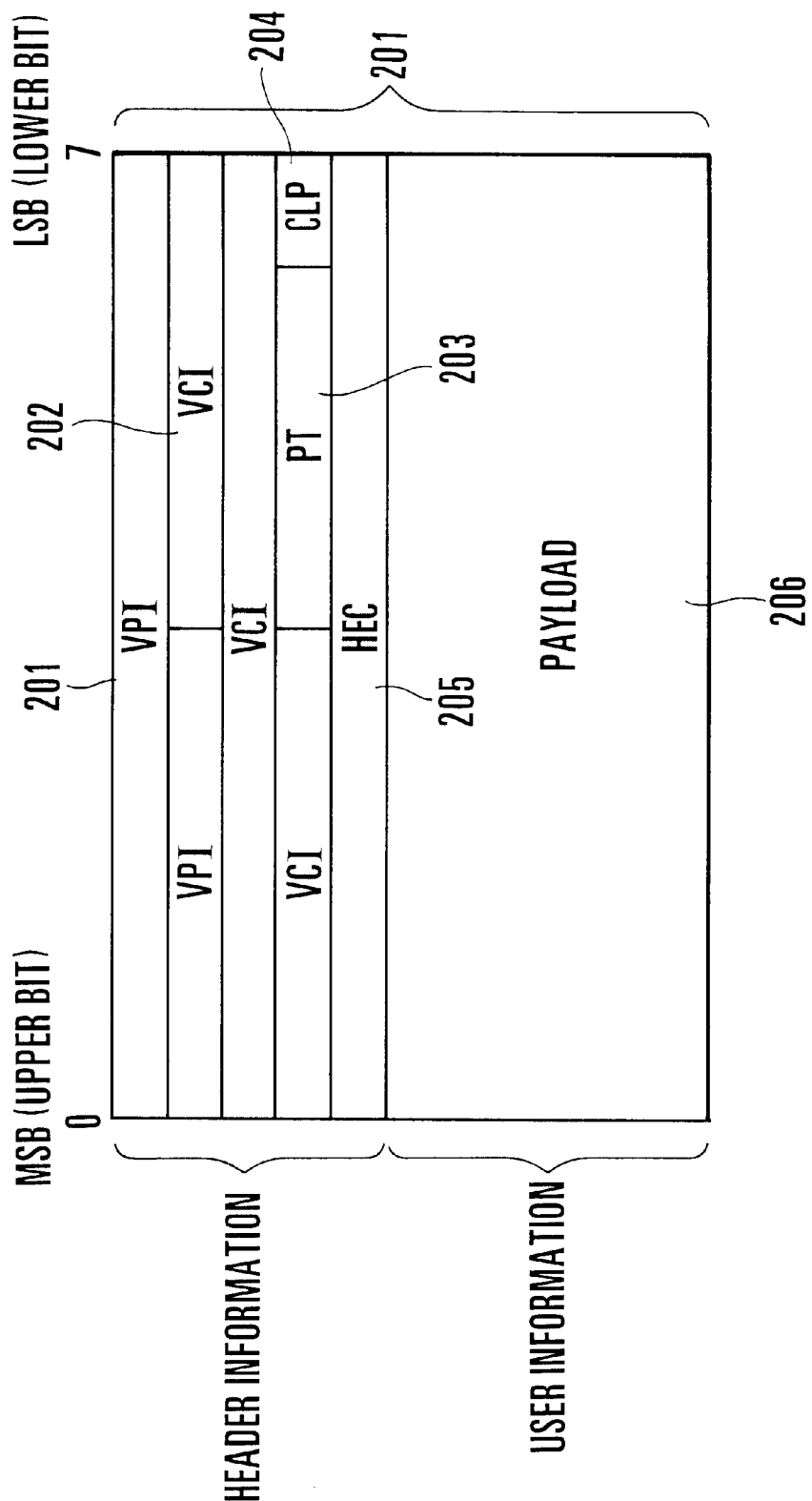
F I G. 2

| INPUT PORT | INPUT VPI/VCI | OUTPUT VPI/VCI | OUTPUT PORT |
|---|---|---|---|
| ATM INPUT PORT #0 | AA/BB | CC/DD | ATM OUTPUT PORT #0 |
| ATM INPUT PORT #1 | EE/FF | GG/HH | ATM OUTPUT PORT #0 |
| ATM INPUT PORT #0 | II/JJ | KK/LL | ATM OUTPUT PORT #1 |
| --- | --- | --- | --- |

FIG. 3

| 501 | 502 | 503 | 504 | /106 |
|---|---|---|---|---|
| SOURCE LAYER 3 ADDRESS | DESTINATION LAYER 3 ADDRESS | OUTPUT VPI-VCI | OUTPUT PORT | |
| 012345 | 131415 | CC/DD | ATM OUTPUT PORT #0 |
| 567890 | 151718 | GG/HH | ATM OUTPUT PORT #0 |
| 101112 | 192021 | KK/LL | ATM OUTPUT PORT #1 |
| ⋮ | ⋮ | ⋮ | ⋮ |

F I G. 5

| 601 | 602 | /108 |
|---|---|---|
| MAC ADDRESS | OUTPUT PORT | |
| 01234567 | ATM OUTPUT PORT #0 |
| 89101112 | ATM OUTPUT PORT #0 |
| 13141516 | ATM OUTPUT PORT #1 |
| ⋮ | ⋮ |

F I G. 6

| 701 | 702 | 703 | 704 | 705 |
|---|---|---|---|---|
| DESTINATION NETWORK ADDRESS | MASK INFORMATION | METRIC | NEXT SWITCH ADDRESS | OUTPUT PORT |
| 10.1.2.0 | 255.255.255.0 | 2 | 10.1.1.6 | ATM OUTPUT PORT #0 |
| 10.1.1.0 | 255.255.255.0 | 4 | 10.1.3.4 | ATM OUTPUT PORT #0 |
| 133.00.0.0 | 255.0.0.0 | 2 | 10.1.1.6 | ATM OUTPUT PORT #1 |
| ⋮ | ⋮ | ⋮ | ⋮ | ⋮ |

F I G. 7

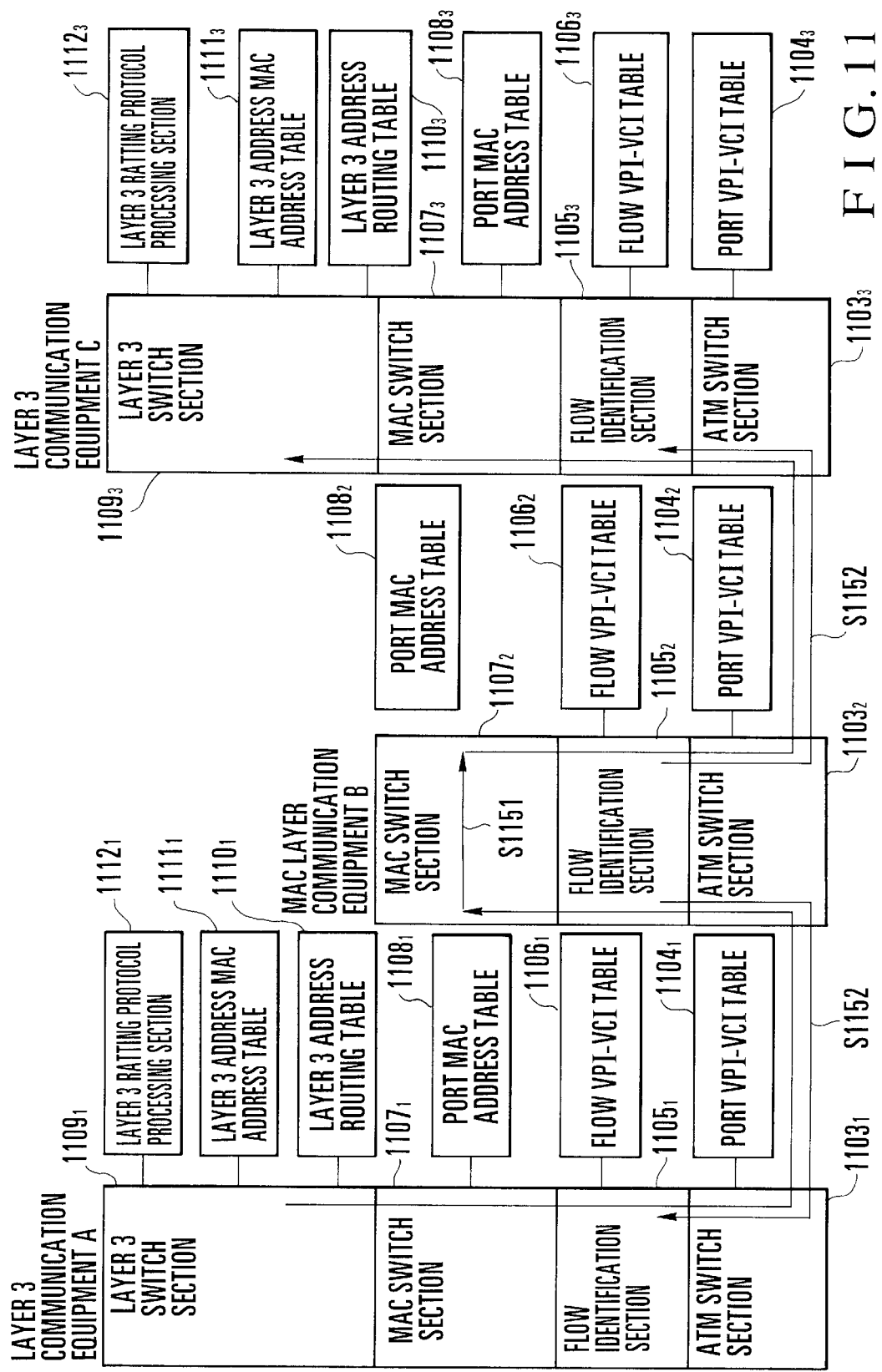
F I G. 11

MULTILAYER ATM COMMUNICATION EQUIPMENT

BACKGROUND OF THE INVENTION

The present invention relates to an ATM (Asynchronous Transfer Mode) communication equipment and, more particularly, to a multilayer ATM communication equipment for forming a large-scale network at a low cost.

A conventional ATM communication equipment realizes high-speed data transfer by setting connection from a source to a destination before data transfer. With diversification of communication purposes and an increase in communication amount, however, the overhead for connection setting before data transfer cannot be neglected.

In contrast to this, there has been proposed an ATM communication equipment which can perform high-speed data transfer by using routing information on layer 3 as a network layer in connection setting, and uses a scheme of easily realizing connection setting to generate a shortcut path. For example, this technique is applied to an ATM communication equipment using the IFMP (Ipsilon Flow Management Protocol) of RFC (Request For Comments) 1954 of IETF (International Engineering Task Force).

The operation principle of this equipment will be described with reference to FIG. 14. Each switching node is composed of an ATM switch 1401 and an IP (Internet Protocol) controller 1402. At the start of transfer, since no shortcut path is set, a cell that has arrived at the ATM switch 1401 at the start of a data transfer flow and forms an IP packet is formed into an IP packet by the IP controller 1402. After this, an output port from which a cell is to be transferred is determined in accordance with the IP routing protocol, and cell transfer 1413 is performed from this output port to an adjacent switching node.

This IP controller 1402 identifies the flow of the packet, and assigns VPI (Virtual Path Identifier) information and VCI (Virtual Channel Identifier) information to the ATM cell in this flow when determining that the flow will continue for a long period of time. The IP controller 1402 then performs notification 1414 to the upper switching node located on the transmission side of this flow. When the notification of the assignment of the VPI and the VCI to the ATM cell in this flow is notified from the downstream switching node located on the reception side of the flow, the VPI and the VCI notified to the upstream side are made to correspond to the VPI and VCI notified from the downstream side, and a shortcut path 1415 is set in the ATM switch 1401.

Subsequently, the PI packet belonging to this flow is transferred as an ATM cell to an output port 1416 through the set shortcut path without being formed into an IP packet by the IP controller 1402. This shortcut path is canceled by monitoring the traffic and detecting that the same flow does not arrive for a predetermined period of time.

It is also important to construct a large-scale network by using such a communication equipment. As a communication equipment for constructing this large-scale network, a communication equipment using the STA (Spanning Tree Algorithm) of avoiding a loop in a network by performing route selection control between a plurality of bridges is available.

According to the communication equipment in "Network Construction Method" in Japanese Patent Laid-Open No. 6-350606, a large-scale network is constructed by forming a tree by using the STA of a lower bridge relative to a reception bridge on the basis of a time value obtained when a predetermined data frame is received and a predetermined timeout value.

According to "Spanning Tree Port Management Method" in Japanese Patent Laid-Open No. 8-195770, upon detection of a change in the connected state of a plurality of networks, ports which are not to be connected to the networks are disconnected, thereby preventing double relay operation even if the STA is used when a plurality of networks are connected to each other.

When data transfer on layer 2 as a data link layer is performed through a route based on the STA while a plurality of networks are connected to each other, transfer on layer 2 as a data link layer is performed concurrently with data transfer on a network layer after a given port is blocked, and a route is selected by the RIP (Routing Information Protocol). As a result, a heavy load is imposed on this system. In order to prevent this, the "Inter-LAN Connection Apparatus" in Japanese Patent Laid-Open No. 5-235943 can operate a metric value for this port when route setting is to be performed on layer 3, thereby reducing the load.

According to the "Bridge Apparatus and Network Construction Method" disclosed in Japanese Patent Laid-Open No. 5-235945, when networks with different data link protocol links on the data link layers are to be connected to each other, connection between different protocols can be performed by using data link protocol processing means equal in number to the bridge apparatuses.

The "MAC Bridge Control System" disclosed in Japanese Patent Laid-Open No. 5-22294 includes several learning tables such as a port number/MAC (Media Access Control) address table. In this system, when different types of networks, especially a high-speed network and a low-speed network, are connected to each other, and information corresponding to a frame to be transferred cannot be obtained from these learning tables, the frame is discarded, thereby preventing unnecessary traffic in the low-speed network.

A conventional multilayer ATM communication equipment can set a connection serving as a shortcut path used only to exchange information about assignment of a VPI and a VCI to a flow between adjacent switch nodes. However, IP routing protocol processing must be performed for all the switching nodes, requiring a complicated, expensive equipment.

In addition, like a general router, this equipment must set a sub-network indicated by an IP address for each input/output port, and the arrangement of the sub-network is limited by the input/output port of a node. For this reason, when a network terminal moves, re-setting of the IP address of the network terminal and the like must be performed.

SUMMARY OF THE INVENTION

It is an object of the present invention to provide an inexpensive communication equipment which can construct a large-scale network without making all switching nodes have a layer 3 routing protocol processing function.

It is another object of the present invention to provide a communication equipment which can make a network have flexibility by obviating the necessity for, for example, re-setting of the IP address of a network terminal upon movement of the network terminal.

In order to achieve the above objects, according to the present invention, there is provided a multilayer ATM communication equipment comprising an input port for inputting an ATM cell as transfer input data, an output port for outputting the ATM cell as transfer output data, port information storage means in which transfer route information for determining a transfer route of the ATM cell input from the input port, and input port information and output port information which respectively correspond to the transfer route information are stored, ATM transfer output means for transferring/outputting the ATM cell from an output port corresponding to the output port information stored in the port information storage means on the basis of the transfer route information in the input ATM cell and an input port number corresponding to the input port from which the ATM cell is input, MAC frame forming means for forming the ATM cell input from the input port into an MAC frame on an MAC layer as one of constituent elements of a data link layer of the ATM cell input from the input port, on the basis of the transfer route information in the ATM cell, flow information storage means in which flow information as information corresponding to each of destination information and source information in the ATM cell input from the input port, and transfer output information for transferring/outputting the ATM cell in accordance with the flow information are stored, flow transfer means for, when transfer output information corresponding to the flow information of the MAC frame formed by the MAC frame forming means is stored in the flow information storage means, transferring/outputting the MAC frame from the output port on the basis of the transfer output information, MAC address storage means in which destination information of the MAC frame and transfer output information corresponding to the destination information are stored, and MAC layer transfer output means for, when transfer output information corresponding to destination information in an MAC frame is stored in the MAC address storage means, transferring/outputting the MAC frame from the output port on the basis of the transfer output information corresponding to the MAC frame, and when the transfer output information is not stored in the MAC address storage means, assigning a new input port, notifying a transmission-side switch of the flow information of the MAC frame and the assigned input port, setting a shortcut path on the basis of an output port notified from a reception-side switch, and transferring/outputting the MAC frame from the notified output port.

BRIEF DESCRIPTION OF THE DRAWINGS

FIG. 2 is a view showing the arrangement of an ATM cell used in the multilayer ATM communication equipment in FIG. 1;

FIG. 3 is a view showing the arrangement of a port VPI-VCI table in FIG. 1;

FIG. 5 is a view showing the arrangement of a flow VPI-VCI table in FIG. 1;

FIG. 6 is a view showing the arrangement of a port MAC address table in FIG. 1;

FIG. 7 is a view showing the arrangement of a layer 3 address routing table in FIG. 1;

FIG. 11 is a block diagram for explaining the first sequence of data transfer to be performed when the respective embodiments of the present invention are combined;

DESCRIPTION OF THE PREFERRED EMBODIMENTS

Figure 1:
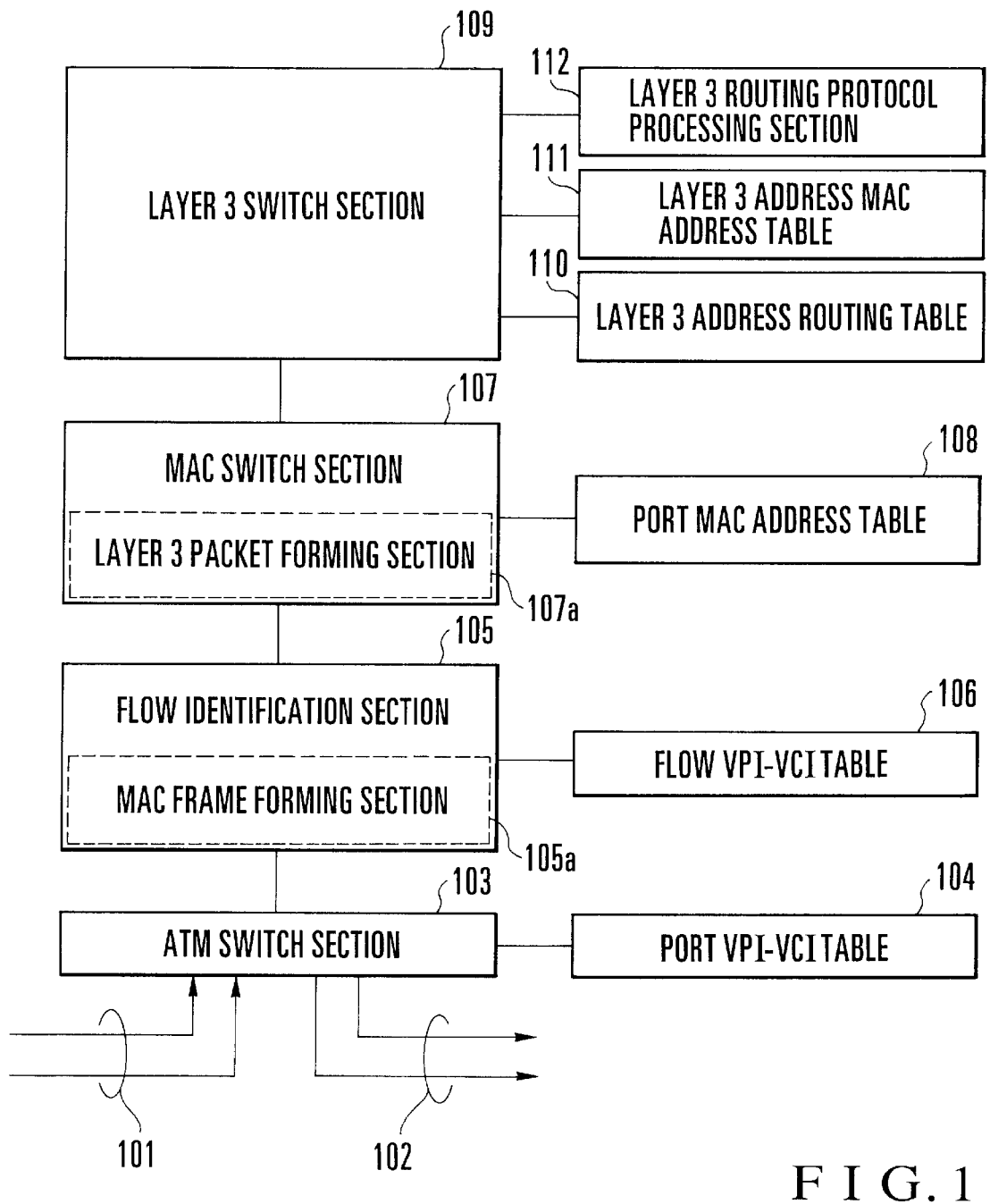
FIG. 1 is a block diagram showing a layer 3 multilayer ATM communication equipment according to the first embodiment of the present invention.

The present invention will be described in detail below with reference to the accompanying drawings.
First Embodiment FIG. 1 shows a multilayer layer 3 communication equipment according to the first embodiment of the present invention. The multilayer layer 3 communication equipment shown in FIG. 1 includes an ATM switch section (ATM transfer output means) 103, a flow identification section (flow transfer means) 105 having an MAC frame forming section (MAC frame forming means) 105a, an MAC switch section (transfer output means for MAC layer) 107 having a layer 3 packet forming section (layer 3 packet forming means) 107a, and a layer 3 switch section (transfer output means for layer 3) 109.

The ATM switch section 103 has two input ports 101 and two output ports 102. A port VPI-VCI table (port information storage means) 104 is connected to the ATM switch section 103. A flow VPI-VCI table (flow information storage means) 106 is connected to the flow identification section 105. A port MAC address table (MAC address storage means) 108 is connected to the MAC switch section 107.

A layer 3 address routing table 110, a layer 3 address MAC address table 111, and a layer 3 routing protocol processing section 112 are connected to the layer 3 switch section 109.

In the multilayer communication equipment having this arrangement, the ATM cell input to one of the input ports 101 is transferred/output from one of the output ports 102 which is obtained by referring to the port VPI-VCI table 104, the flow VPI-VCI table 106, and the port MAC address table 108, which are arranged on the respective layers, without being formed into a packet for layer 3.

The multilayer layer 3 communication equipment according to this embodiment will be described in detail below with reference to the arrangements of an ATM cell as a unit of transfer and the respective reference tables.

FIG. 2 shows the arrangement of an ATM cell. As shown in FIG. 2, an ATM cell 201 is roughly composed of the header information and user information of the transfer cell. The header information is composed of a 12-bit VPI 201 and a 16-bit VCI 202 which are used to determine a transfer route for the transfer cell, a 3-bit PT (Payload Type) 203 indicating the attributes of user information, 3-bit CLP (Cell Loss Priority) 204 for determining that the transfer cell is to be discarded at the occurrence of transfer congestion, and 8-bit HEC (Header Error Control) 205 for performing error correction for the transfer cell.

The user information of the transfer cell consists of a 48-byte payload 206. As described above, ATM transfer is performed in units of cells each consisting of 53 (8+48) bytes.

FIG. 3 shows the arrangement of the port VPI-VCI table 104. In the port VPI-VCI table 104, ATM output port VPI/VCI information (to be referred to as output VPI/VCI hereinafter) 303 and an ATM output port (to be referred to as an output port hereinafter) 304 correspond to an ATM input port (to be referred to as an input port) 301 and ATM input port VPI/VCI information (to be referred to as input VPI/VCI hereinafter) 302. A shortcut path is therefore set on the basis of the input port 301, the input VPI/VCI 302, the output VPI/VCI 303, and the output port 304.

Figure 4:
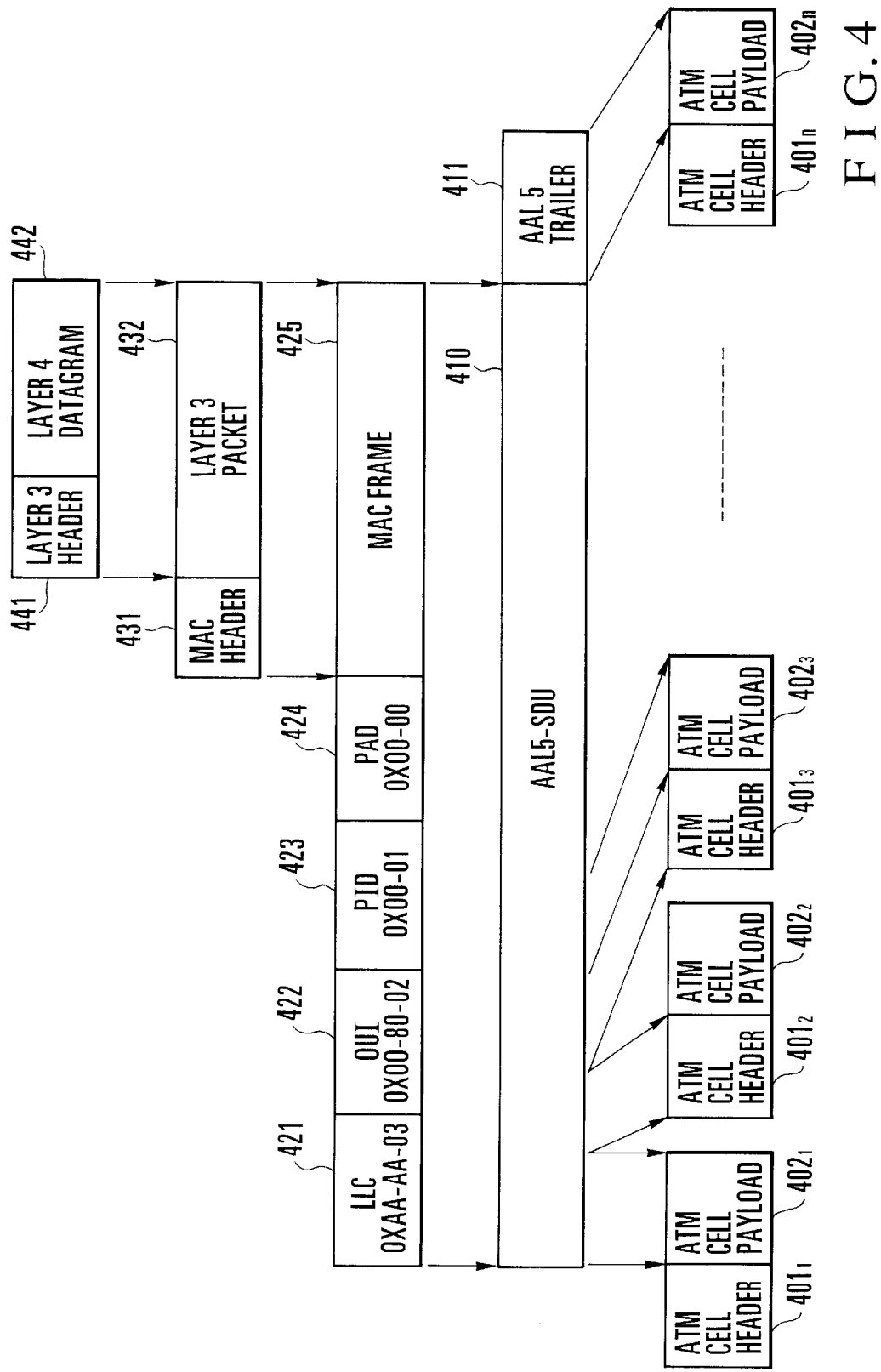
FIG. 4 is a view showing the mapping arrangement of ATM transfer data used in the multilayer ATM communication equipment in FIG. 1.

FIG. 4 shows the mapping arrangement of ATM transfer data on each layer. As shown in FIG. 4, an ATM cell header $401_1$, an ATM cell payload $402_1$, an ATM cell header $401_2$, an ATM cell payload $402_2$, . . . , an ATM cell header $401_n$, and an ATM cell payload $402_n$ can be formed into an AAL (ATM Adaptation Layer) 5-SDU 410 and an AAL trailer 411 which are pieces of upper layer information.

The AAL 5-SDU 410 is formed by adding an LLC (Logical Link Control) field 421, an OUI (Organizationally Unique Identifier) field 422, a PID (Packet Identifier) field 423, and a PAD (Padding) field 424 to an MAC frame 425.

The MAC frame 425 as a unit of transfer on the MAC layer is formed by adding an MAC header 431 to a layer 3 packet 432. The layer 3 packet 432 as a unit of transfer on layer 3 is formed by adding a layer 3 header 441 to a layer 4 datagram 442.

The ATM switch section 103 shown in FIG. 1 determines, on the basis of the VPI 201 and the VCI 202 which are defined as transfer route information in the header information of the ATM cell 201 (FIG. 2) input from one of the input ports 101, whether the ATM cell 201 is to be formed into an MAC frame.

If it is determined that the ATM cell is not formed into an MAC frame, the ATM output port 304 and the output VPI/VCI 303 used for transfer are obtained on the basis of the port VPI-VCI table 104. If it is determined that the ATM cell is formed into an MAC frame, the input ATM cell is output to the flow identification section 105.

Assume that the ATM cell is to be output to the flow identification section 105 to be formed into an MAC frame. In this case, when information indicating that the ATM cell is to be sent to the flow identification section 105 is written in the output port 304 in the port VPI-VCI table 104, the cell having the corresponding VPI and VCI can be transferred to the flow identification section 105. The MAC frame forming section 105a of the flow identification section 105 forms the ATM cell 201 transferred from the ATM switch section 103 into an MAC frame by performing, for example, AAL5 processing.

In addition, the flow identification section 105 obtains the output port 304 and the output VPI/VCI 303 to identify the flow of the transfer cell by referring to the flow VPI-VCI table 106 on the basis of the destination address and the source address on layer 3 in the layer 3 header.

FIG. 5 shows the arrangement of the flow VPI-VCI table 106 in FIG. 1. In the flow VPI-VCI table 106 shown in FIG. 5, a source layer 3 address 501, a destination layer 3 address 502, an output VPI/VCI 503, and an output port 504 are made to correspond to each other. In addition, the source layer 3 address 501 and the destination layer 3 address 502 on source layer 3 are used as flow information to identify the flow.

If the flow VPI-VCI table 106 includes no flow based on the corresponding destination address and source address, the flow identification section 105 outputs the formed MAC frame to the MAC switch section 107.

The MAC switch section 107 obtains an output port from the port MAC address table 108 on the basis of the desti- nation MAC address in the MAC header of the MAC frame output from the flow identification section 105.

FIG. 6 shows the arrangement of the port MAC address table 108 in FIG. 1. To transfer the MAC frame to the next switch, a correlated output port 602 can be obtained from the port MAC address table 108 on the basis of a destination MAC address 601.

As described above, when an MAC frame is output from the flow identification section 105 to the MAC switch section 107, since there are no VPI and VCI assigned to each transfer flow, the MAC switch section 107 transfers the MAC frame through the ATM switch section 103 by using specific VPI and VCI set between the adjacent switches in advance.

If there is no destination MAC address in the port MAC address table 108, the MAC switch section 107 transfers an MAC address solution request packet to the correlated output port. Upon reception of a replay packet in response to this request packet, the MAC switch section 107 learns this reply result in the port MAC address table 108 by using the received port as an output port.

The contents of this replay packet are also learnt by switches other than the switch that generates the request. Before the corresponding MAC frame is transmitted, this MAC frame is registered in the port MAC address table 108 of the switch on the way to the destination, thereby allowing the use of this MAC frame for next transfer operation.

When the destination MAC address on the MAC layer is the MAC address of the self-switch, the layer 3 packet forming section 107a of the MAC switch section 107 forms the MAC frame into a layer 3 packet and outputs it to the layer 3 switch section 109.

The layer 3 switch section 109 obtains an ATM output port from the layer 3 address routing table 110 on the basis of the destination layer 3 address in the header of the output layer 3 packet. If layer 3 is an IP, the IP address is composed of a network address portion and a host address portion. Only the network address portion of the IP address is registered in the layer 3 address routing table 110. The destination IP address is compared with network addresses, starting from the most significant bit, and the network address having the longest coincident bit length is regarded as an address corresponding to this destination IP address.

FIG. 7 shows the arrangement of the layer 3 address routing table 110. In the layer 3 address routing table 110 shown in FIG. 7, a destination network address 701, mask information 702, a Metric value 703 serving as a weight for route selection, a Next Switch address 704 indicating the next transfer destination switch, and an output port 705 are made to correspond to each other.

When an ATM output port is obtained from the layer 3 address routing table 110 on the basis of the destination layer 3 address in the header of the layer 3 packet, an MAC address indicating the next switch on the route reaching the destination address is obtained from the layer 3 address MAC address table 111 in correspondence with the destination layer 3 address.

Figures 8, 9:
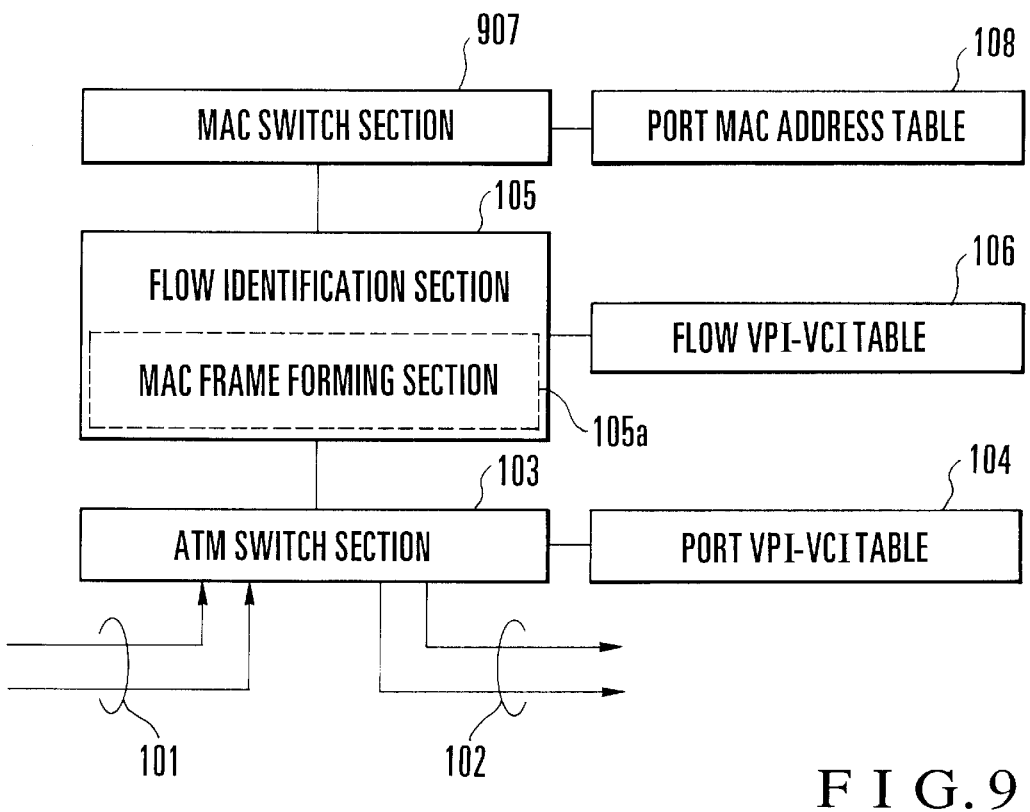
FIG. 8 is a view showing the arrangement of a layer 3 MAC address table in FIG. 1.
FIG. 9 is a block diagram showing an MAC layer communication equipment according to the second embodiment of the present invention.

FIG. 8 shows the arrangement of the layer 3 address MAC address table 111 in FIG. 1. In the layer 3 address MAC address table 111 shown in FIG. 8, a layer 3 address 801 indicating a destination and an MAC address 802 indicating the next transfer switch.

In layer 3 routing, if a layer 3 communication equipment is present on the way to a direct destination, data is transferred to the layer 3 communication equipment corresponding to the next hop. For this reason, the MAC address in the layer 3 address MAC address table 111 sometimes coincides with the MAC address of the layer 3 communication equipment corresponding to the next hop.

In this case, since there are no VPI and VCI assigned to each flow, data is transferred through the ATM switch section 103 by using a specific VPI and VCI set in advance between the adjacent switches.

If there is no destination MAC address in the layer 3 address MAC address table 111, the MAC address solution request package is transferred to all the output ports. Since a replay packet for this request packet includes a destination MAC address, the reply result is learnt in the layer 3 address MAC address table 111.

The layer 3 routing protocol processing section 112 forms a layer 3 routing protocol by processing the layer 3 packet used to transfer a message containing a routing protocol. If the destination layer 3 address of the layer 3 packet is the self-layer 3 address, the packet is not transferred to other communication equipmentes and is processed as a layer 3 packet for transferring a message containing a routing protocol. In addition, a layer 3 packet for transferring a message containing a routing protocol is generated, as needed.

Second Embodiment

FIG. 9 shows the arrangement of a communication equipment for an MAC layer according to the second embodiment of the present invention. The same reference numerals in FIG. 9 denote the same parts as in FIG. 1, and a description thereof will be omitted.

In the second embodiment, the switch section for layer 3 is omitted from the layer 3 communication equipment of the first embodiment. The second embodiment includes an ATM switch section 103 to which two input ports 101, two output ports 102, and a port VPI-VCI table 104 are connected, a flow identification section 105 which is connected to the ATM switch section 103 and to which a flow VPI-VCI table 106 is connected, and an MAC switch section 907 which is connected to the flow identification section 105 and to which a port MAC address table 108 is connected. The flow identification section 105 includes an MAC frame forming section 105a. The operations of these blocks are the same as those of the ATM layer 3 communication equipment.

Similar to the MAC switch section 107 in the first embodiment, the MAC switch section 907 obtains an ATM output port from the port MAC address table 108 on the basis of the destination MAC address in the MAC header of the MAC frame output from the flow identification section 105.

As in the first embodiment, data is to be transferred from the flow identification section 105, since there are no VPI and VCI assigned to each transfer flow, the data is transferred through the ATM switch section 103 by using a specific VPI and VCI set in advance between the adjacent switches.

If there is no destination MAC address in the port MAC address table 108, an MAC address solution request packet is transferred to the correlated output port. Upon reception of a reply packet in response to this request packet, the MAC switch section 907 uses this received port as an output port, and learns the reply result in the port MAC address table 108.

The contents of this reply packet are also learnt by switches other than the switch that generates the request. Before the corresponding MAC frame is transmitted, this MAC frame is registered in the port MAC address table 108 of the switch on the way to the destination, thereby allowing the use of this MAC frame for next transfer operation.

By identifying the flow of transfer data and making the data correspond to a VPI and VCI in this manner, data transfer can be realized in the communication equipment of the MAC layer as well by shortcut path setting more advanced than in the conventional bridge apparatus.

Third Embodiment

Figure 10:
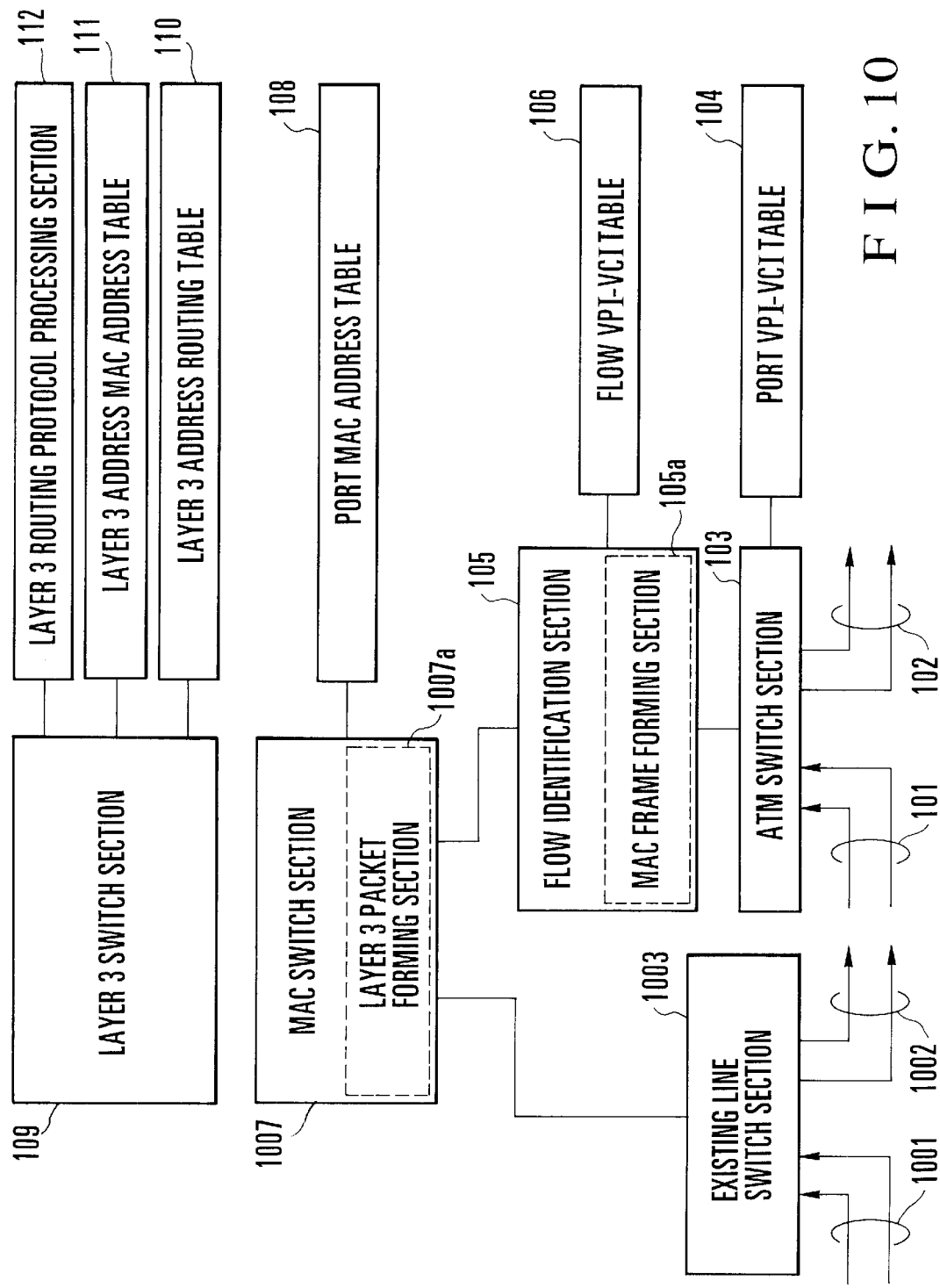
FIG. 10 is a block diagram showing the arrangement of a gateway switch according to the third embodiment of the present invention.

FIG. 10 shows the arrangement of a gateway switch according to the third embodiment of the present invention. The same reference numerals in the third embodiment denote the same parts as in the first embodiment, and a description thereof will be omitted.

In the third embodiment, data is input from an existing circuit switch section 1003 to which lines other than ATM lines are connected and which has a plurality of input ports 1001 and a plurality of output ports 1002 to an MAC switch section 1007. Referring to FIG. 10, a layer 3 packet is transferred in accordance with the result obtained by processing a routing protocol on layer 3.

The operations of other blocks are the same as those of the layer 3 communication equipment described above. The gateway switch for transferring data in accordance with a port MAC address table 108 can be implemented by an arrangement equivalent to the arrangement shown in FIG. 10 from which the layer 3 switching function is omitted.

According to the gateway switch of the third embodiment, the data input from lines other than ATM lines are transferred to the MAC switch section 1007 after the existing line switch section 1003 absorbs differences between networks, e.g., differences in media and protocols, by, for example, forming data in accordance with ATM transfer.

The MAC switch section 1007 operates in the same manner as the MAC switch section 107 except that the MAC switch section 1007 can change connection between a flow identification section 105 and the existing line switch section 1003 depending on whether input/output operation for data transfer is to be performed through ATM lines or lines other than ATM lines.

The gateway switch capable of absorbing differences between networks can also cope with a more flexible network by using the present invention.

The switch operation in data transfer operation in each embodiment described above will be described.

Figure 12:
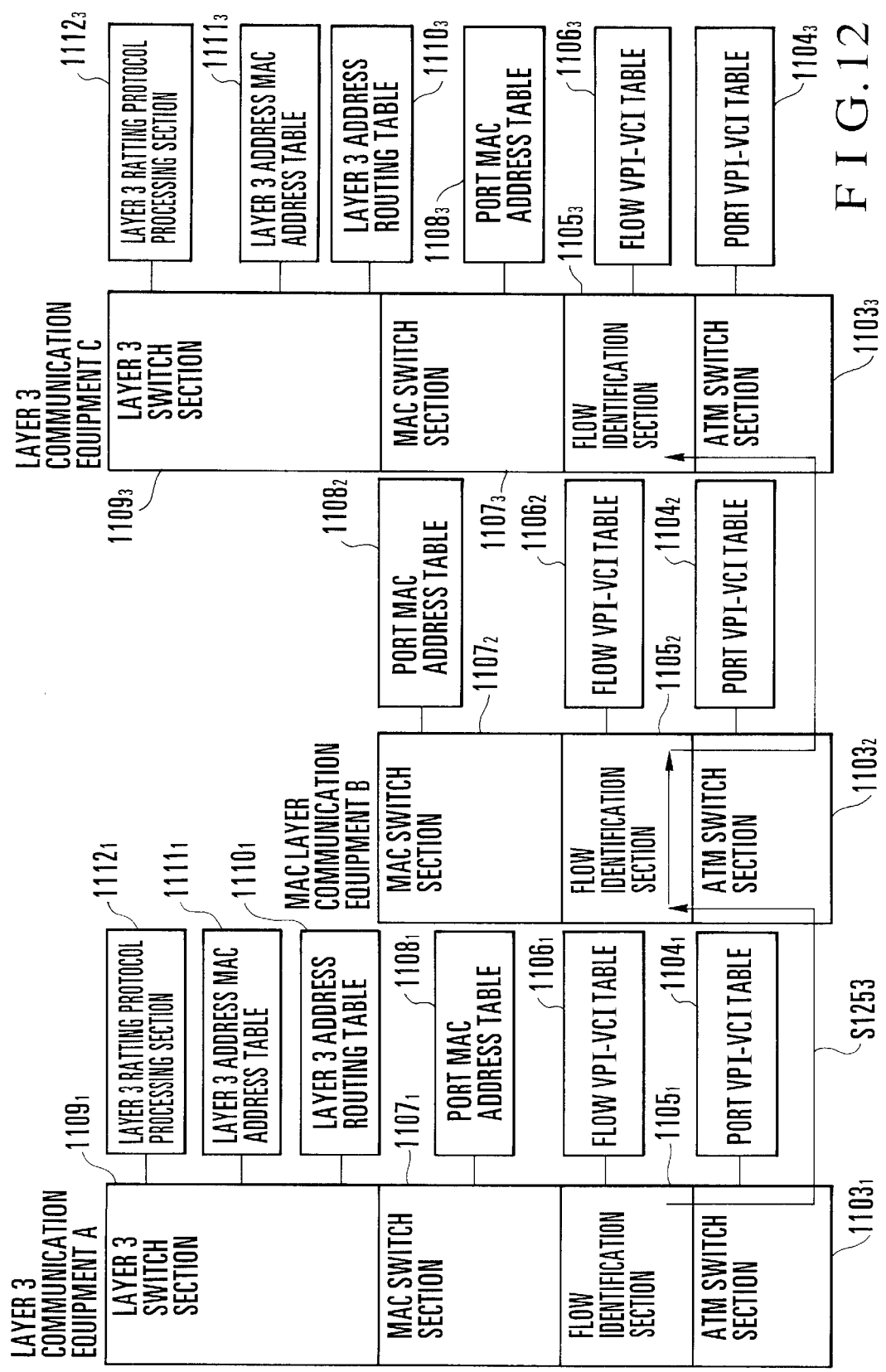
FIG. 12 is a block diagram for explaining the second sequence of data transfer to be performed when the respective embodiments of the present invention are combined.
Figure 13:
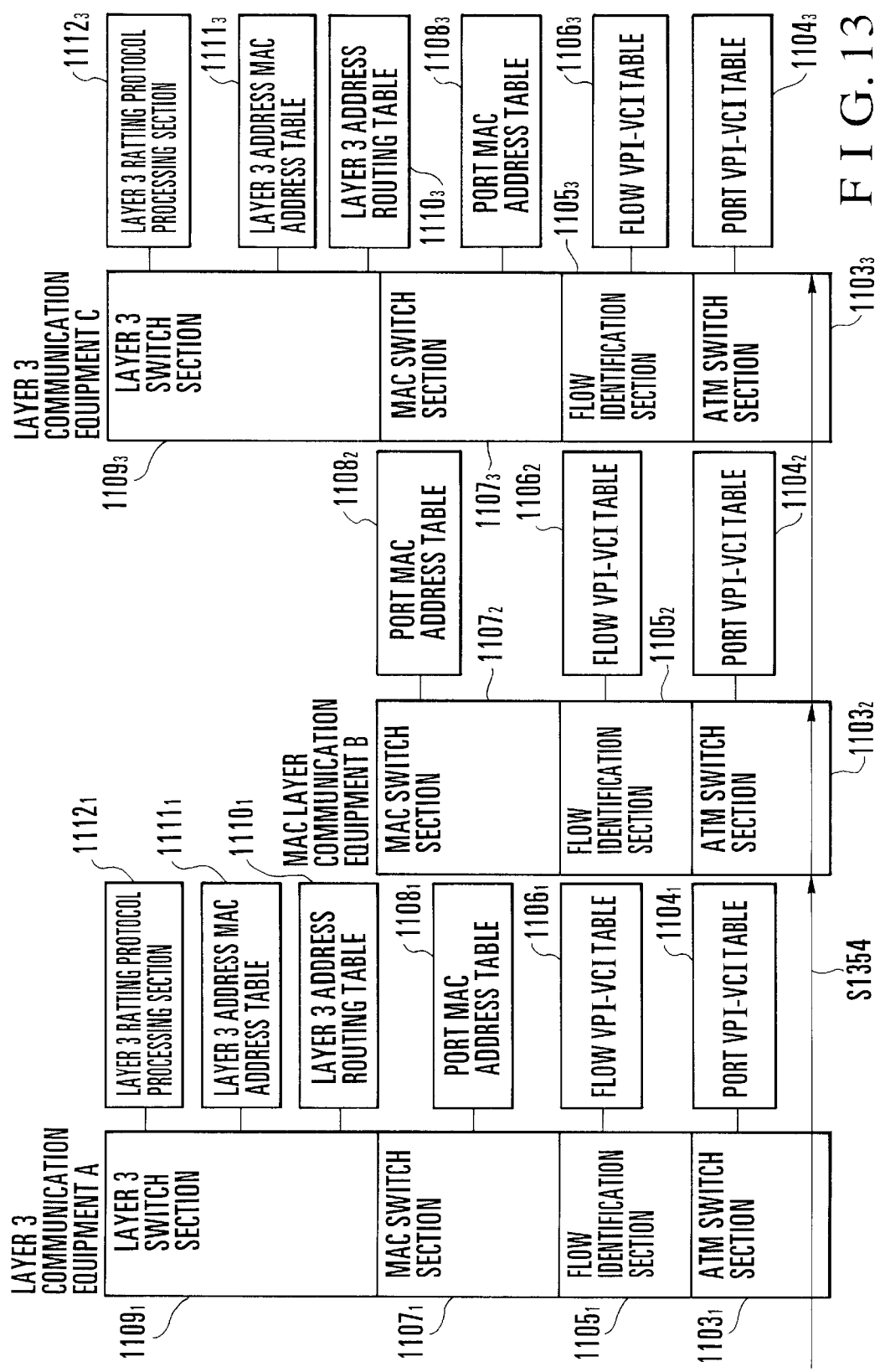
FIG. 13 is a block diagram for explaining the third sequence of data transfer to be performed when the respective embodiments of the present invention are combined.
Figure 14:
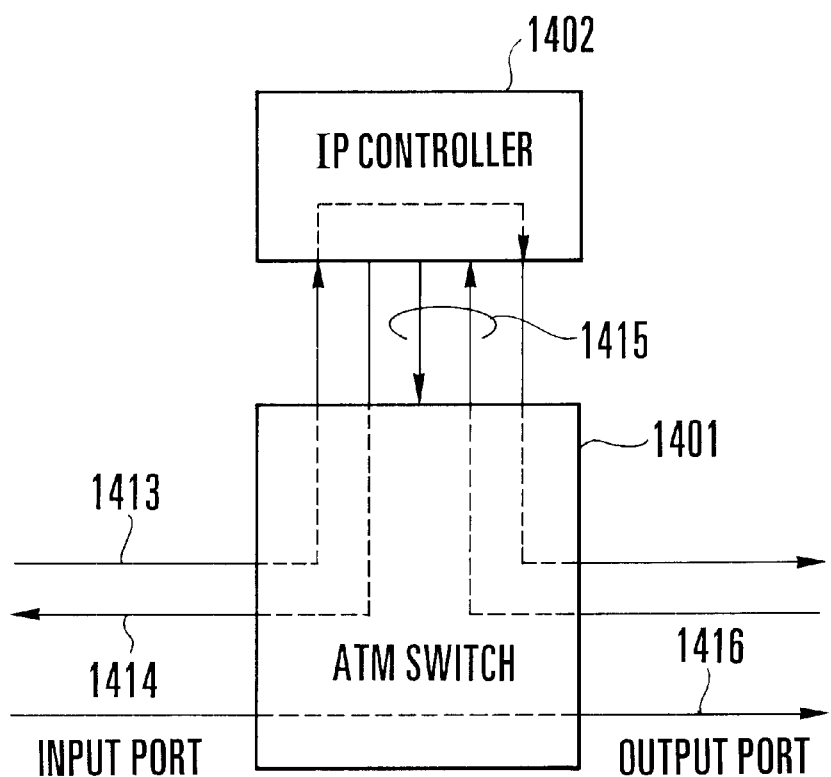
FIG. 14 is a block diagram showing the arrangement of a conventional communication equipment designed to perform shortcut path setting.

FIGS. 11 to 13 explain the data transfer operation of a combination of the layer 3 communication equipment and the MAC layer communication equipment in the respective embodiments described above. Referring to FIGS. 11 to 13, a layer 3 communication equipment A in FIG. 1, an MAC layer communication equipment B in FIG. 9, and a layer 3 communication equipment C in FIG. 1 are connected to each other. A case wherein data is transferred from the layer 3 communication equipment A to the layer 3 communication equipment C through the MAC layer communication equipment B will be described below.

Referring to FIG. 11, since the address data of the first MAC frame and the first layer 3 packet in a data transfer flow are not registered in flow VPI-VCI tables $1106_1$ to $1106_3$ of the flow identification section, the MAC frame is transferred to an MAC switch section $1107_2$ in the MAC layer communication equipment B and to an MAC switch section $1107_3$ or a layer 3 switch section $1109_3$ in the layer 3 communication equipment C. FIG. 11 shows a case wherein the MAC frame is transferred to the layer 3 switch section $1109_3$.

In this transfer operation, the MAC frame is transferred in accordance with the port MAC address table, and the layer 3 packet is transferred in accordance with the layer 3 routing table. If the layer address of the destination to which the layer 3 packet is to be transferred next is not registered in a layer 3 MAC address table $1111_1$, or the layer address of the destination to which the MAC frame is to be transferred next is not registered in a PORT MAC address table $1108_2$, an MAC address solution request packet is transmitted to all the output ports associated with the network including the destination. When a reply packet for this MAC address solution request packet is received, the contents of the reply packet are learnt in each table, thereby transferring the MAC frame and the layer 3 packet. This transfer is performed by using a VPI and VCI which are determined in advance for specific flow transfer between the adjacent switches but are not assigned for normal transfer (step S1151).

Assume that no associated address data is registered in the flow VPI-VCI table $1106_2$ of the flow identification section. In this case, when the ATM cell received by only an ATM switch section $1103_2$ is to be transferred to an output port without being formed into an MAC frame or layer 3 packet because, for example, this flow demands long-term data transfer, a VPI and a VCI are assigned to the flow, and the flow information and VPI/VCI information are notified to the switch on the upstream side of the flow (step S1152).

Referring to FIG. 12, upon notification of the assignment of the VPI and the VCI to the flow described above, the flow identification section of each switch registers the notified flow information and the VPI/VCI information in the flow VPI-VCI table. Until this notification of assignment, this table is used by registering the VPI and VCI predetermined and used for the flow transfer and the output port used for the transfer. After registration, transfer of an MAC frame and a layer 3 packet through this flow is performed by referring to the flow VPI-VCI table $1106_2$ (step S1253).

Referring to FIG. 13, the assignment of the VPI and the VCI is notified to the upstream switch located on the transmission side described above. Upon notification of the assignment of the VPI and the VCI from the downstream switch on the reception side, the ATM switch section connects input and output ports corresponding to the input VPI, the input VCI, the output VPI, and the output VCI. With this operation, a shortcut path is set, and the associated data are registered in a port VPI-VCI table $1104_2$. An ATM cell belonging to a flow set as a shortcut path in this manner is transferred without being formed into an MAC frame or layer 3 packet (step S1354).

In each embodiment described above, there are two input ports and two output ports. However, the same effect can be obtained even if, for example, the number of ports is three or more.

In the first embodiment, an MAC frame is formed by AAL5 processing. However, an MAC frame may be formed by, for example, AAL3 processing or AAL4 processing. No change in effect occurs regardless of the forming method used.

In the first embodiment, the layer 3 destination address and source address in a layer 3 header are used to identify the flow. However, information on layer 4 or any upper layer may be used. When, for example, "TCP/UDP" is used as layer 4, destination and source port numbers can be used.

The same operation as described above is performed by the gateway switch using the present invention. An existing line section other than ATM line sections, located before the MAC switch section, operates in the same manner as a general bridge, whereas an existing line section located before the layer 3 switch section operates in the same manner as a general router.

By logically connecting switches through an MAC layer switch in the form of a tree, a wasteful traffic for switches irrelevant to a destination can be reduced. A scheme of logically connecting switches in the form of a tree can be set in each switch or can be set by using the spanning tree protocol disclosed in IEEE (Institute of Electrical and Electronics Engineers) 82. 1. D without any change in effect.

In a gateway switch which accommodates existing lines other than ATM lines and performs layer 3 routing protocol processing, when a terminal accommodating ATM lines is connected to a layer 3 communication equipment, different VPIs are assigned to a plurality of networks by using the layer 3 routing protocol.

In the multilayer ATM communication equipment of the present invention, data transfer can be performed by discriminating the destination network for the layer 3 packet of an input flow and using the VPI assigned to this destination network. With this operation, logically separate networks can be constructed without imposing any physical limitations on the networks as a whole. In each network, the switches are logically connected in the form of a tree, and transfer can be performed along the tree.

In addition, when the number of ATM cells communicated is monitored in each shortcut path, and no ATM cell communicated in a given shortcut path is detected in a predetermined period of time or more, the shortcut path can be canceled.

The gateway switch at the exit of the flow in the ATM communication equipment of the present invention monitors information on layer 4 or any upper layer. When cancellation of a session on an upper layer is detected, the cancellation of the shortcut path is notified to the switch on the transmission side of the flow, and the notification is transferred to each switch on the upstream side, thereby realizing faster cancellation of the shortcut path.

If, for example, layer 4 is a TCP, the FIN field of a TCP header is monitored. If the ON state of the FIN state is detected, the cancellation of the shortcut path may be notified. With this operation, connection cancellation can be performed faster.

As described above, a shortcut path can be easily formed by adding a flow identification means to an MAC layer switch, and exchanging flow/VPI/VCI assignment information between the adjacent switches. In addition, a large-scale network capable of high-speed data transfer can be constructed by using an inexpensive MAC layer switch having no function of processing a layer 3 routing protocol. Furthermore, a more flexible network can be constructed at a lower cost by constructing it in consideration of the functions that can be realized by the present invention.

As has been described above, according to the present invention, since the flow identification means is arranged on the MAC layer to allow setting of a shortcut path without performing routing protocol processing on layer 3 as a network layer, a large-scale network can be constructed at a low cost.

In addition, since the flow identification means is arranged on the MAC layer to allow the MAC switch section to perform input/output operation through lines other than ATM lines and to allow setting of a shortcut path without performing routing processing on layer 3 as a network layer, a large-scape network having flexibility with respect to communication layers can be constructed at a low cost.

Further, since the flow identification means is arranged on the MAC layer to allow setting of a shortcut path without performing routing protocol processing on layer 3 as a network layer, a large-scale network can be constructed at low cost.

In addition, since the flow identification means is arranged on the MAC layer to allow setting of a shortcut path without performing routing protocol processing on layer 3 as a network layer, a large-scale network can be constructed at a low cost. Furthermore, when the MAC address of a destination is unknown, the contents of a reply packet for a transmitted address solution request packet are held in the respective switching nodes on the way to the destination. This obviates the necessity for the switching nodes on the way to the destination to perform address solution owing to this held information.

Since the connection of a communication flow restricted by the number of ports can be quickly canceled, a flexible network can be constructed in accordance with a communication purpose.

The connection of a specific communication flow can be quickly canceled by canceling a temporarily set shortcut path in accordance with an application. Therefore, a flexible network can be constructed in accordance with a communication purpose.

In addition, since logically separate networks an be constructed throughout all switching nodes independently of the input/output ports of the switching nodes, data passes through the layer 3 switch means only when data transfer is performed between different networks. This reduces the load on the layer 3 switch means for performing layer 3 routing protocol processing.

Furthermore, since logically separate networks can be constructed throughout all switching nodes independently of the input/output ports of the switching nodes, even if a given terminal is moved and connected to a switching node different from the one to which the terminal has been connected, no address change is required. This can improve the maintainability of the network.

Moreover, more sophisticated, efficient data transfer can be performed by providing flow information in accordance with the purpose of an application regardless of the destination and source information in the header information of a transfer cell.

What is claimed is:

1. A multilayer ATM communication equipment comprising:

an input port for inputting an ATM cell as transfer input data;

an output port for outputting the ATM cell as transfer output data;

port information storage means in which transfer route information for determining a transfer route of the ATM cell input from said input port, and input port information and output port information which respectively correspond to the transfer route information are stored;

ATM transfer output means for transferring/outputting the ATM cell from an output port corresponding to the output port information stored in said port information storage means on the basis of the transfer route information in the input ATM cell and an input port number corresponding to said input port from which the ATM cell is input;

MAC frame forming means for forming the ATM cell input from said input port into an MAC frame on an MAC layer as one of constituent elements of a data link layer of the ATM cell input from said input port, on the basis of the transfer route information in the ATM cell;

flow information storage means in which flow information as information corresponding to each of destination information and source information in the ATM cell input from said input port, and transfer output information for transferring/outputting the ATM cell in accordance with the flow information are stored;

flow transfer means for, when transfer output information corresponding to the flow information of the MAC frame formed by said MAC frame forming means is stored in said flow information storage means, transferring/outputting the MAC frame from said output port on the basis of the transfer output information;

MAC address storage means in which destination information of the MAC frame and transfer output information corresponding to the destination information are stored; and MAC layer transfer output means for, when transfer output information corresponding to destination information in an MAC frame is stored in said MAC address storage means, transferring/outputting the MAC frame from said output port on the basis of the transfer output information corresponding to the MAC frame, and when the transfer output information is not stored in said MAC address storage means, assigning a new input port, notifying a transmission-side switch of the flow information of the MAC frame and said assigned input port, setting a shortcut path on the basis of an output port notified from a reception-side switch, and transferring/outputting the MAC frame from said notified output port.

2. An equipment according to claim 1, further comprising:

layer 3 packet forming means for forming the MAC frame into a layer 3 packet when a destination of the MAC frame is a self-switch; and layer 3 transfer output means for transferring/outputting the layer 3 packet formed by said layer 3 packet forming means, in accordance with routing protocol processing for route selection on the basis of the destination of the layer 3 packet.

3. An equipment according to claim 1, wherein said equipment further comprises existing line connection means, having an existing line input port and an existing line output port which performs connection to a line incompatible with ATM transfer by inputting/outputting data as transfer input/output data incompatible with ATM transfer, for converting transfer input data input from said existing line input port into ATM frame data and converting transfer output data output from said existing line output port into data incompatible with ATM transfer, said MAC layer transfer output means selectively transfers/outputs the MAC frame from said output port based on the transfer output information and the MAC frame from said output port notified from said reception-side switch, in accordance with the MAC frame stored in said MAC address storage means and the presence/absence of the transfer output information corresponding to destination information of frame data formed by one of said existing line connection means, and said layer 3 transfer output means transfers/outputs the layer 3 packet formed by said layer 3 packet forming means from one of said output port and said existing line output port.

4. An equipment according to claim 1, wherein when no transfer output information is present in said MAC address storage means, said MAC layer transfer output means sends a destination solution request packet to an associated port, holds information contained in a reply packet, and sets a shortcut path on the basis of the held information, thereby transferring/outputting the MAC frame.

5. An equipment according to claim 1, wherein a flow identification means monitors the number of ATM cells communicated in each shortcut path, and cancels a shortcut path when no communicated ATM cell is detected in a period of time not less than a predetermined period of time.

6. An equipment according to claim 1, wherein a flow identification means monitors information on an upper layer for each shortcut path, and cancels a shortcut path on the basis of monitored information on an upper layer.

7. An equipment according to claim 1, wherein a network is constructed on the basis of transfer route information contained in an ATM cell and used to determine a transfer route, and destination information of a transfer packet is discriminated, thereby transferring an MAC frame.

8. An equipment according to claim 1, wherein an MAC layer switch and a layer 3 switch are logically connected to each other by constructing a network on the basis of transfer route information contained in an ATM cell and used to determine a transfer route.

9. An equipment according to claim 1, wherein said flow transfer means identifies flow information on the basis of destination information, source information, and upper layer information incorporated in a frame formed by the MAC frame.

10. A multilayer ATM communication equipment comprising:

an input port for inputting an ATM cell as transfer input data;

an output port for outputting the ATM cell as transfer output data;

port information storage means in which transfer route information for determining a transfer route of the ATM cell input from said input port, and input port information and output port information which respectively correspond to the transfer route information are stored;

ATM transfer output means for transferring/outputting the ATM cell from an output port corresponding to the output port information stored in said port information storage means on the basis of the transfer route information in the input ATM cell and an input port number corresponding to said input port from which the ATM cell is input;

MAC frame forming means for forming the ATM cell input from said input port into an MAC frame on an MAC layer as one of constituent elements of a data link layer of the ATM cell input from said input port, on the basis of the transfer route information in the ATM cell;

flow information storage means in which flow information as information corresponding to each of destination information and source information in the ATM cell input from said input port, and transfer output information for transferring/outputting the ATM cell in accordance with the flow information are stored;

flow transfer means for, when transfer output information corresponding to the flow information of the MAC frame formed by said MAC frame forming means is stored in said flow information storage means, transferring/outputting the MAC frame from said output port on the basis of the transfer output information;

MAC address storage means in which destination information of the MAC frame and transfer output information corresponding to the destination information are stored; and MAC layer transfer output means for, when transfer output information corresponding to destination information in an MAC frame is stored in said MAC address storage means, transferring/outputting the MAC frame from said output port on the basis of the transfer output information corresponding to the MAC frame, and when the transfer output information is not stored in said MAC address storage means, assigning a new input port, notifying a transmission-side switch of the flow information of the MAC frame and said assigned input port, setting a shortcut path including an output port on the basis of information contained in a packet returned from an associated port upon sending a destination solution request packet thereto, and transferring/outputting the MAC frame from said set output port;

layer 3 packet forming means for forming the MAC frame into a layer 3 packet when a destination of the MAC frame is a self-switch; and layer 3 transfer output means for transferring/outputting the layer 3 packet formed by said layer 3 packet forming means, in accordance with routing protocol processing for route selection on the basis of the destination of the layer 3 packet.

* * * * *